United States Patent
Han et al.

(10) Patent No.: US 10,952,157 B2
(45) Date of Patent: Mar. 16, 2021

(54) APPARATUS AND METHOD FOR MEASURING TRAFFIC OF USERS USING DISTRIBUTED ANTENNA SYSTEM

(71) Applicant: Samsung Electronics Co., Ltd., Suwon-si (KR)

(72) Inventors: Kyuho Han, Seongnam-si (KR); Byoungchul Moon, Seongnam-si (KR); Kiyoung Han, Yongin-si (KR); Sangheon Lee, Seoul (KR); Hanseok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 15/043,007

(22) Filed: Feb. 12, 2016

(65) Prior Publication Data

US 2016/0242044 A1 Aug. 18, 2016

(30) Foreign Application Priority Data

Feb. 13, 2015 (KR) ........................ 10-2015-0022460

(51) Int. Cl.
*H04W 52/26* (2009.01)
*H04W 56/00* (2009.01)
(Continued)

(52) U.S. Cl.
CPC .......... *H04W 52/265* (2013.01); *H04B 17/27* (2015.01); *H04L 47/28* (2013.01);
(Continued)

(58) Field of Classification Search
None
See application file for complete search history.

(56) References Cited

U.S. PATENT DOCUMENTS 8,082,096 B2    12/2011   Dupray
2012/0149428 A1*  6/2012  Yang ................. H04W 56/0045
                                                           455/524

(Continued)

FOREIGN PATENT DOCUMENTS

CN    1812626 A    8/2006
CN    102396274 A   3/2012
(Continued)

OTHER PUBLICATIONS

Chinese Office Action dated Mar. 4, 2020, issued in Chinese Patent Application No. 201680009459.5.
(Continued)

*Primary Examiner* — Jeffrey M Rutkowski
*Assistant Examiner* — Basil Ma
(74) *Attorney, Agent, or Firm* — Jefferson IP Law, LLP

(57) ABSTRACT

A system and method are provided to efficiently provide coverage within a large scale of a building by identifying user equipment (UE) on a floor by floor basis using a distributed antenna system (DAS) and pseudo timing advance values (TA) assigned to each floor. By applying different pseudo delays on a plurality of distributed antenna basis located at each floor, a base station can know a floor at which a user equipment is located through a timing advance value of the user equipment. When a traffic amount increases based on the measured traffic amount of each floor, the base station may increase a carrier and adjust an amplifier output on a floor by floor basis, thereby efficiently using power and maintaining a user's quality of experience (QoE).

11 Claims, 11 Drawing Sheets

(51) Int. Cl.

| | | |
|---|---|---|
| *H04W 64/00* | (2009.01) | |
| *H04W 28/02* | (2009.01) | |
| *H04B 17/27* | (2015.01) | |
| *H04W 24/02* | (2009.01) | |
| *H04L 12/841* | (2013.01) | |
| *H04W 52/38* | (2009.01) | |
| *H04W 52/24* | (2009.01) | |
| *H04W 52/14* | (2009.01) | |
| *H04W 88/08* | (2009.01) | |

(52) U.S. Cl.
CPC ....... *H04W 24/02* (2013.01); *H04W 28/0226* (2013.01); *H04W 28/0252* (2013.01); *H04W 28/0284* (2013.01); *H04W 56/0045* (2013.01); *H04W 64/00* (2013.01); *H04W 52/143* (2013.01); *H04W 52/247* (2013.01); *H04W 52/386* (2013.01); *H04W 88/085* (2013.01)

(56) References Cited

U.S. PATENT DOCUMENTS

| | | | |
|---|---|---|---|
| 2013/0203447 A1* | 8/2013 | Hannan | H04W 64/00 455/456.5 |
| 2014/0050482 A1 | 2/2014 | Berlin et al. | |
| 2014/0112667 A1 | 4/2014 | Neukirch et al. | |
| 2014/0161057 A1* | 6/2014 | Hejazi | H04W 52/243 370/329 |
| 2014/0162664 A1* | 6/2014 | Stapleton | H04W 24/02 455/445 |
| 2014/0323147 A1 | 10/2014 | Junhyo et al. | |
| 2014/0364101 A1 | 12/2014 | Do et al. | |
| 2014/0370912 A1 | 12/2014 | Kurby et al. | |
| 2014/0370917 A1 | 12/2014 | Buchheim et al. | |
| 2014/0372487 A1 | 12/2014 | Pfeifle | |
| 2014/0375505 A1 | 12/2014 | Anderson et al. | |
| 2015/0119079 A1* | 4/2015 | Tarlazzi | G01S 5/06 455/456.1 |
| 2015/0146635 A1* | 5/2015 | Filipovich | H04W 74/0833 370/329 |
| 2015/0189610 A1 | 7/2015 | Siomina et al. | |
| 2015/0282069 A1* | 10/2015 | Hobbs | H04W 52/0206 370/252 |
| 2016/0037550 A1* | 2/2016 | Barabell | H04B 17/318 455/450 |

FOREIGN PATENT DOCUMENTS

| | | |
|---|---|---|
| EP | 1 359 431 A1 | 11/2003 |
| WO | 2009/099063 A1 | 8/2009 |
| WO | 2010/093294 A1 | 8/2010 |
| WO | 2012/106798 A1 | 8/2012 |
| WO | 2013/028197 A1 | 2/2013 |
| WO | 2014027942 A1 | 2/2014 |

OTHER PUBLICATIONS

Korean Office Action dated Jan. 21, 2021, issued in Korean Application No. 10-2015-0022460.

* cited by examiner

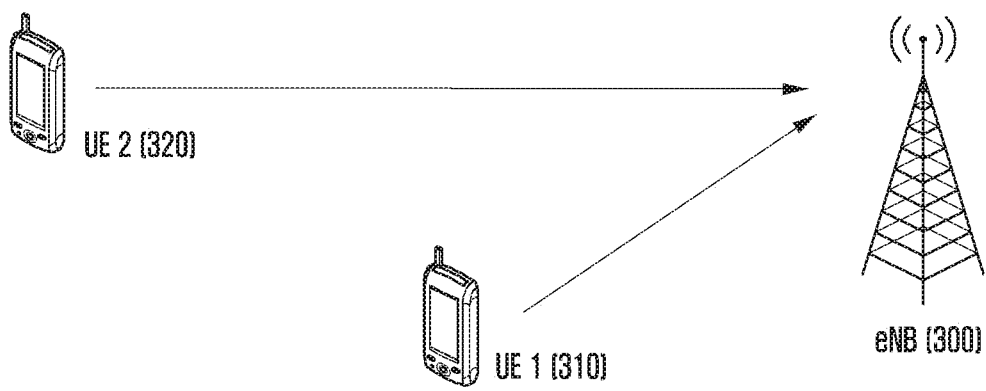
FIG. 3C
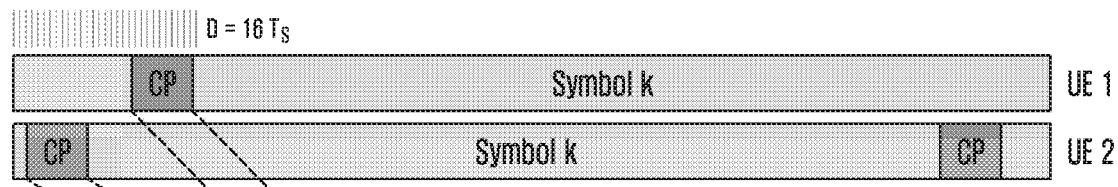
FIG. 3A UE TRANSMITTING TIMING
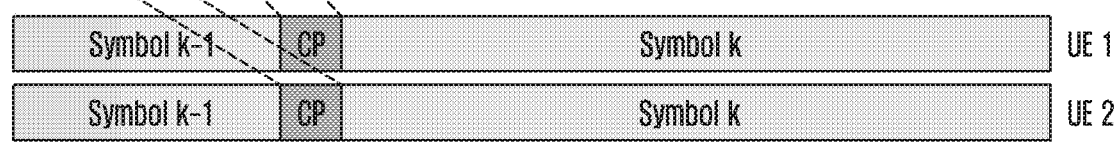
FIG. 3B ENB RECEIVING TIMING

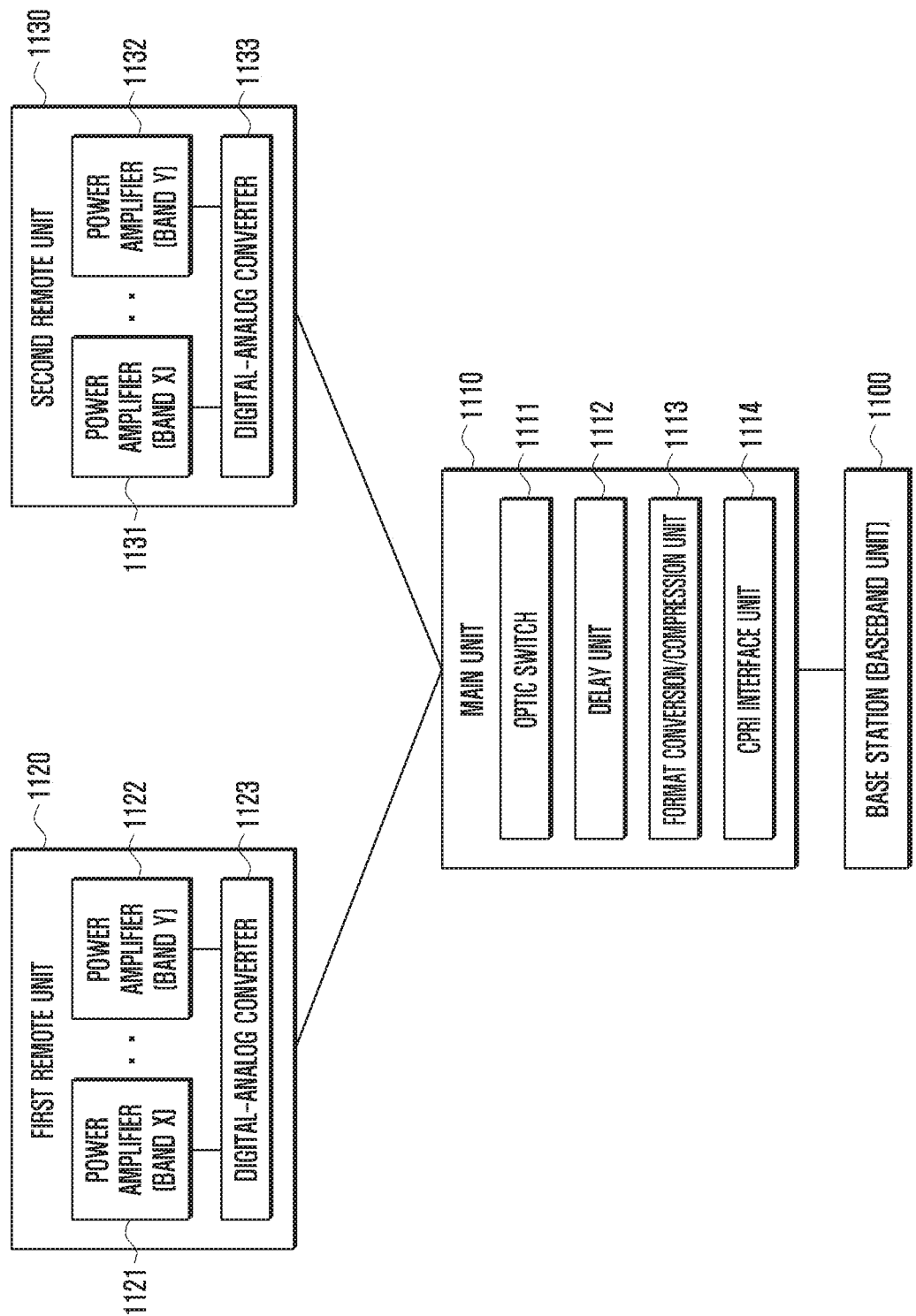

APPARATUS AND METHOD FOR MEASURING TRAFFIC OF USERS USING DISTRIBUTED ANTENNA SYSTEM

CROSS-REFERENCE TO RELATED APPLICATION(S)

This application claims the benefit under 35 U.S.C. § 119(a) of a Korean patent application filed on Feb. 13, 2015 in the Korean Intellectual Property Office and assigned Serial number 10-2015-0022460, the entire disclosure of which is hereby incorporated by reference.

TECHNICAL FIELD

The present disclosure relates to a distributed antenna system (DAS) in a building. More particularly, the present disclosure relates to a method and apparatus for measuring user traffic in a building using a DAS in the building.

BACKGROUND

A distributed antenna system (DAS) uses a plurality of distributed antennas connected to a single base station by wire or a dedicated line. The base station manages a plurality of antennas distributed and located within a cell serviced by the base station. The DAS is different from a centralized antenna system (CAS) in which antennas of a base station are intensively located at the center of a cell in that the plurality of antennas in the DAS are distributed within a cell.

In order to efficiently provide coverage in a large scale building, a recent mobile communication network provider has used a DAS connected by an optical fiber. In this case, because one cell provides a service to a plurality of floors of the building, there is a drawback in that a distribution of users and traffic within the cell is not known. For example, a distribution of users and traffic on respective floors of the building is not known. As used herein, the term "traffic" represents an amount of data or an occupying time of moving data through a network and describes a load applied to a communication apparatus or system based thereon.

However, when traffic is concentrated at a specific floor of the building, a user's quality of experience (QoE) is deteriorated due to the traffic concentration and since a mobile communication network provider cannot analyze the cause, the provider cannot efficiently operate the communication network to correct the problem. Therefore, a method of measuring traffic of each floor of the building is required.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide a method and apparatus for measuring user traffic in a building using a distributed antenna system (DAS).

In accordance with an aspect of the present disclosure, a method for providing service to a user equipment (UE) or similar environment is provided. The method includes determining a pseudo timing advance (TA) value to apply to each location, transmitting the pseudo TA value to apply to at least one UE located at the each location respectively, receiving an uplink signal from a UE, calculating a TA value of the UE based on the uplink signal transmitted by the UE, and determining a location at which the UE is located based on the TA value of the UE and the pseudo TA value. the UE transmits the uplink signal to a base station based on the pseudo TA value.

In accordance with another aspect of the present disclosure, a base station to provide service to a UE or similar environment using a DAS is provided. The base station includes a transceiver that transmits and receives signals; and a controller that is configured to control to determine a pseudo timing advance (TA) value to apply to each location, and transmit the pseudo TA value to apply to at least one UE located at the each floor respectively, receive an uplink signal from a UE, and calculate a TA value of the UE based on the uplink signal transmitted by the UE. The UE transmits the uplink signal to a base station based on the pseudo TA value.

In accordance with another aspect of the present disclosure, a base station to provide service to a UE or similar environment using a DAS is provided. The system includes a transceiver that transmits and receives signals; and a controller that is configured to control to determine a pseudo timing advance (TA) value to apply to each location, and transmit the pseudo TA value to apply to at least one UE located at the each floor respectively, receive an uplink signal from a UE, calculate a TA value of the UE based on the uplink signal transmitted by the UE, and configure additional communication resource to a location at which an overload is located based on at least one of a number of users and a traffic of the each location. The UE transmits the uplink signal to a base station based on the pseudo TA value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which:

FIGS. 3A to 3C are diagrams illustrating timing advance (TA) of a plurality of UEs and a base station according to various embodiments of the present disclosure;

FIG. 11 is a block diagram illustrating a configuration of a system including a main unit and remote units according to an embodiment of the present disclosure.

The same reference numerals are used to represent the same elements throughout the drawings.

DETAILED DESCRIPTION

Figure 1:
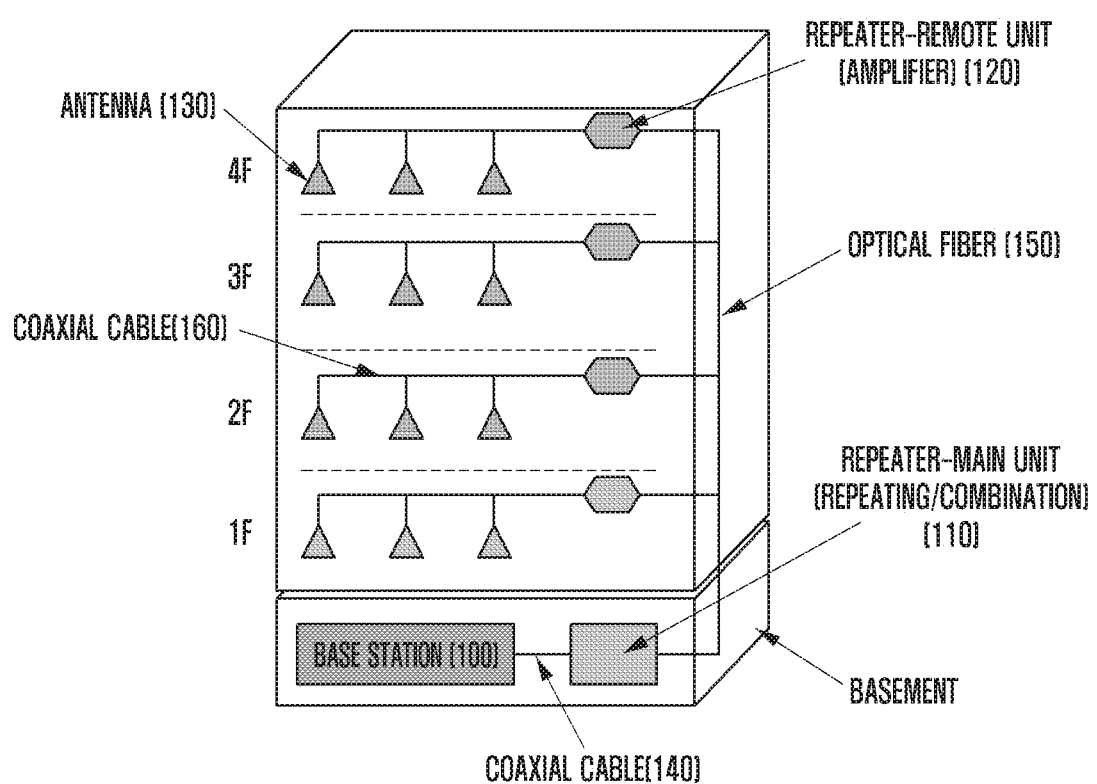
FIG. 1 is a diagram illustrating a method in which a mobile communication network provider of a building provides coverage.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Further, when describing in detail various embodiments of the present disclosure, an orthogonal frequency division multiplexing (OFDM)-based wireless communication system, particularly, a $3^{rd}$ generation partnership project evolved universal mobile telecommunications system terrestrial radio access network (3GPP E-UTRAN) standard is described as a main subject, but the subject matter of the present disclosure may be applied with a little change to other communication systems having a similar technical background and channel form without departing from the scope of the present disclosure.

It may be understood that each block of message flow diagrams and combinations described herein may be performed by computer program instructions. Because these computer program instructions may be installed in a processor of a universal computer, a special computer, or other programmable data processing equipment, the instructions performed through a processor of a computer or other programmable data processing equipment generate a means that performs functions described in block(s) of the message flow diagram. In order to implement a function with a specific method, these computer program instructions may be stored at a computer or computer readable memory that can orient a computer or other programmable data processing equipment. Instructions stored at the computer or computer readable memory may produce a production item including an instruction means that performs a function described in block(s) of the message flow diagram. Because computer program instructions may be installed on a computer or other programmable data processing equipment, a series of operations can be performed on the computer or other programmable data processing equipment and generate a process executed with the computer. Instructions that perform on a computer or other programmable data processing equipment may provide operations for executing functions described in block(s) of a message flow diagram.

Further, each block may represent a portion of a module, segment, or code including at least one executable instruction for executing specific logical function(s). Further, in several replaceable execution examples, it should be noted that functions described in blocks may be performed regardless of order. For example, two consecutively shown blocks may be substantially simultaneously performed or may be performed in reverse order according to a corresponding function.

In this case, a term "-unit" used in the present embodiment means a software or hardware component such as field-programmable gate array (FPGA) or application-specific integrated circuit (ASIC) and performs any function. However, "-unit" is not limited to software or hardware. Further, a "-unit" may be stored at a storage medium that can address and reproduce at least one processor. Therefore, for example, "-unit" includes components such as software components, object-oriented software components, class components, and task components, processes, functions, attributes, procedures, subroutines, segments of a program code, drivers, firmware, microcode, circuit, data, database, data structures, tables, arrays, and variables. A function provided within constituent elements and "-units" may be performed by coupling a smaller number of constituent elements and "-units" or by subdividing into additional constituent elements and "-units". Further, constituent elements and "-units" may be implemented to reproduce at least one central processing unit (CPU) within a device or a security multimedia card.

FIG. 1 is a diagram illustrating a method in which a mobile communication network provider of a building provides coverage.

Referring to FIG. 1, in order to provide a service to a large scale building, a mobile communication network provider uses a distributed antenna system (DAS) connected by an optical fiber. A base station 100 (hereinafter, may be referred to as an evolved node B (eNB)) using one cell is connected to a repeater-main unit 110 using a coaxial cable 140, and the repeater-main unit 110 is connected to repeater-remote units 120 located at each floor 1F, 2F, 3F and 4F, of the building by an optical fiber 150. A plurality of antennas 130 located at each floor are connected to respective repeater-remote units 120 by a coaxial cable 160. The base station 100 and the repeater-main unit 110 are located at a basement or rooftop.

In FIG. 1, one cell provides service to four or more floors. When transmitting a downlink signal that transmits a signal from the base station 100 to a user equipment (UE) (not shown), a signal is repeated in the repeater-main unit 110 and the repeater-remote units 120, and the same signal is broadcast on an antenna basis. When transmitting an uplink signal that transmits a signal from the UE to the base station 100, received signals of each of antennas 130 are combined in the repeater-main unit 110 and are transmitted to the base station 100.

In this case, because one cell provides a service to a plurality of floors of the building, there is a drawback that a distribution of users and traffic within the cell is not known.

Figure 2A:
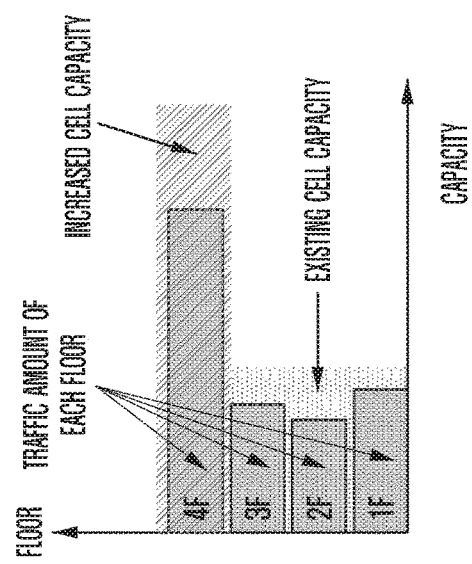
FIGS. 2A to 2C are graphs illustrating problems occurring when traffic of each floor cannot be measured.
Figure 2B:
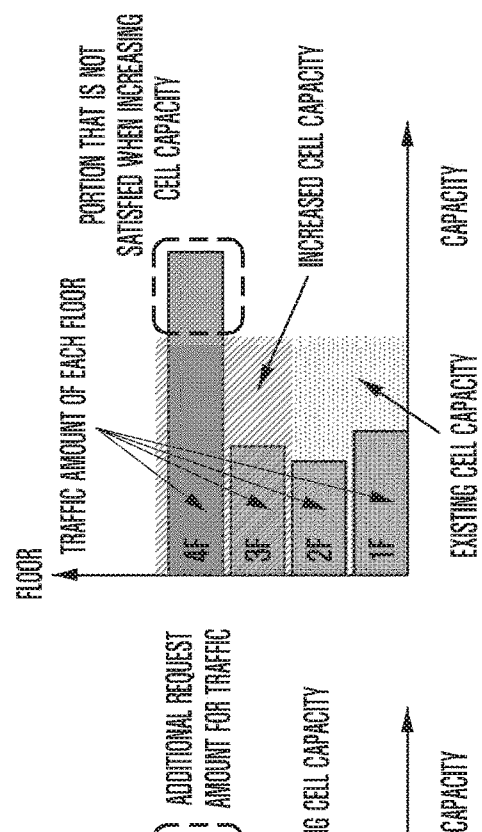
Figure 2C:
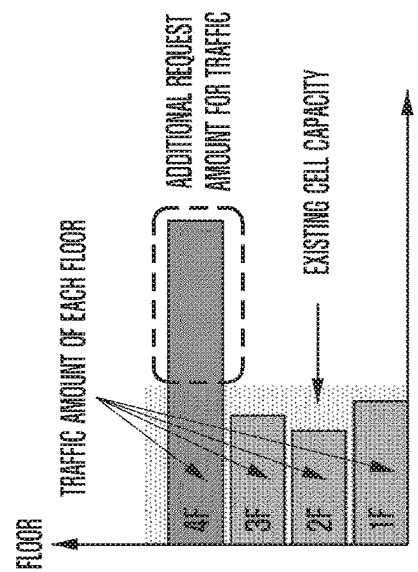

FIGS. 2A to 2C are graphs illustrating problems occurring when traffic of each floor cannot be measured.

Referring to FIG. 2A, when operating four floors of a building as one cell as illustrated in FIG. 1, in one case, a traffic amount of first, second, and third floors 1F, 2F and 3F is smaller than an existing cell capacity, When a traffic amount of a fourth floor 4F is greater than an existing cell capacity, increase of cell capacity is required at the fourth floor.

Referring to FIG. 2B, a case is shown that illustrates an increase of cell capacity in a building when traffic of each floor is not known. When cell capacity is increased without considering a traffic amount of each floor, at the first, second, and third floors 1F, 2F and 3F, cell capacity that is not used remains. At the fourth floor 4F, even after cell capacity is increased, a traffic amount is still greater than an existing cell capacity, compared with the cell capacity.

Referring to FIG. 2C, a case is shown that illustrates an increase of cell capacity in a building when traffic of each floor is measured according to various embodiments of the present disclosure. In FIG. 2C, at the first, second, and third floors 1F, 2F and 3F, cell capacity is not increased and at the fourth floor 4F, cell capacity is intensively increased, unlike the case of FIG. 2B. In such a case, at the first, second, and third floors, cell capacity may satisfy a traffic amount, and now at the fourth floor, an increased cell capacity may handle a larger traffic amount. Therefore, when the mobile communication network provider can measure a traffic amount of each floor, the mobile communication network provider can more efficiently operate a network.

FIGS. 3A to 3C are diagrams illustrating timing advance (TA) of a plurality of UEs and a base station according to various embodiments of the present disclosure.

Because distances between a plurality of UEs and a base station that provides service to the plurality of UEs are different, TA management is a control method in which a UE that is located far from a base station starts transmission relatively quickly, and a UE that is located adjacent to the base station starts transmission relatively slowly, each in consideration of propagation delay. In this case, application of a TA allows a UE to transmit relatively quickly.

Referring to FIG. 3C, a UE 1, 310 is located adjacent to an eNB 300, and a UE 2, 320 is located far from the eNB 300.

Referring to FIG. 3A, transmission timing of the two UEs, wherein the UE 2, 320 transmits a symbol k more quickly than the UE 1, 310 which applies a delay D is illustrated.

Referring to FIG. 3B receiving timing of the eNB 300, wherein the eNB 300 simultaneously receives the symbol k of the UE 1, 310 and the UE 2, 320 is illustrated.

The eNB 300 measures transmission timing of the UE upon performing a random access operation or through a sounding reference signal and notifies the UE of a timing value to correct. The UE adjusts uplink transmission timing using a timing value notified by the eNB and performs uplink transmission.

In the present embodiment of the present disclosure, a method and apparatus for measuring user distribution and traffic of each floor in a building using DAS and applying pseudo delay is described. The base station applies different pseudo delay to a plurality of distributed antennas located at each floor, thereby knowing a floor at which the UE is located through a TA value of the UE.

Figure 4:
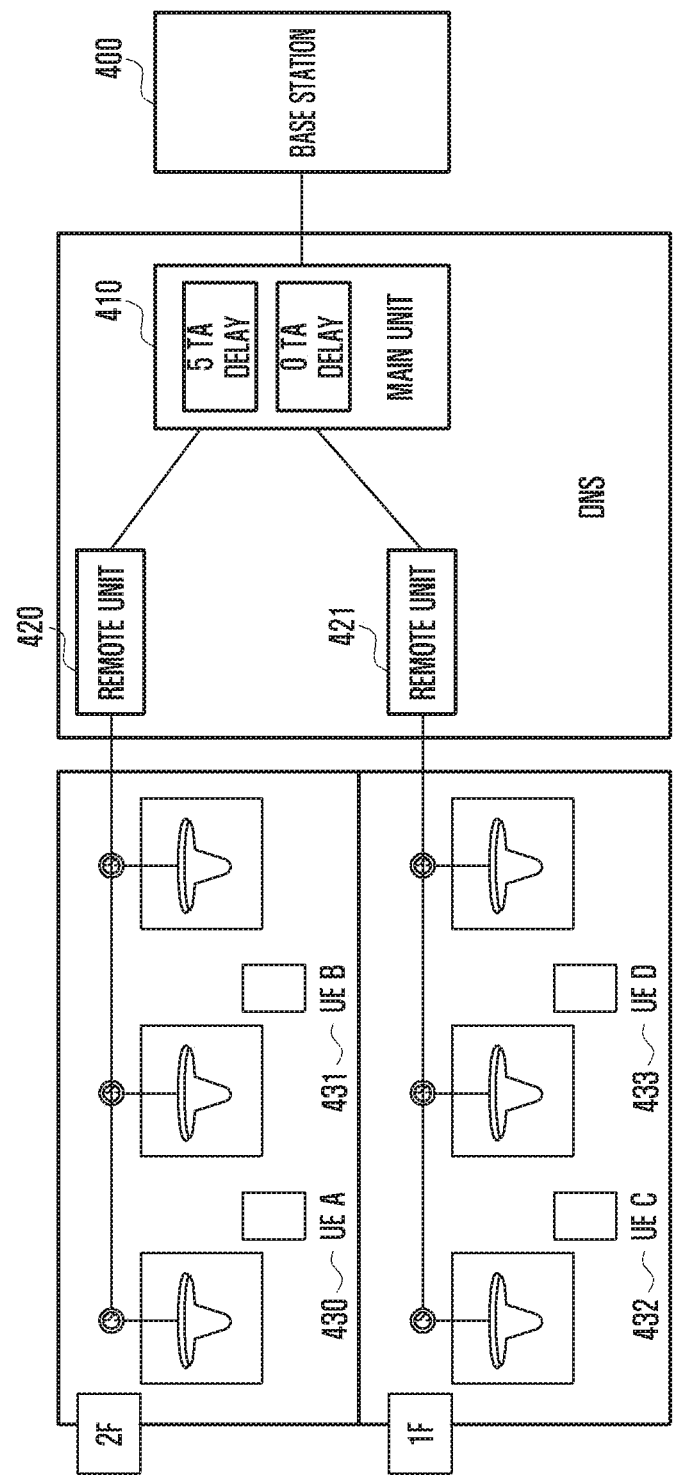
FIG. 4 is a block diagram illustrating a detailed method of measuring user distribution and traffic of each floor in a building using TA according to an embodiment of the present disclosure.

FIG. 4 is a block diagram illustrating a detailed method of measuring user distribution and traffic of each floor in a building using TA according to an embodiment of the present disclosure.

Referring to FIG. 4, a main unit 410 is connected to a base station 400 and determines a pseudo delay value (TA value) to apply to a UE on a floor by floor basis, and notifies a plurality of UEs 430, 431, 432 and 433 of the pseudo delay value through remote units 420 and 421 located at each floor. In FIG. 4, the main unit 410 applies a pseudo delay of 0 TA to a first floor 1F and applies a pseudo delay of 5 TA delay to a second floor 2F. The base station 400 may receive an uplink signal from the UE, compare an allocated TA value and a TA value of the UE, and know a floor at which the UE is located. More specifically, when a difference between a TA value allocated to a specific floor and a measured delay level of the UE is within a specific threshold value, the base station 400 may determine a specific floor at which the UE is located. Table 1 represents an average resource use amount, traffic, and TA of each UE measured by the base station 400.

TABLE 1

| | Use amount of average resource block | Average throughput (bps) | Timing advance | Floor |
|---|---|---|---|---|
| UE A (430) | 10 | 10M | 6 | second floor |
| UE B (431) | 7 | 5M | 5 | second floor |
| UE C (432) | 4 | 2M | 0 | first floor |
| UE D (433) | 5 | 3M | 2 | first floor |

In Table 1, because the TA of the UE A and the UE B is a value close to 5, the base station 400 may determine that the UE A and the UE B are located at a second floor. Further, because the TA of the UE C and the UE D is a value close to 0, the base station 400 may determine that the UE C and the UE D are located at a first floor. In this case, the base station 400 may determine UE distribution of each floor and a resource use amount and traffic of each floor.

When a traffic amount increases based on the measured traffic amount of each floor of the building, the base station 400 may increase a carrier and adjust an output of an amplifier based on the number of users on a floor by floor basis, thereby efficiently using power and maintaining a user's quality of experience (QoE).

Figure 5B:
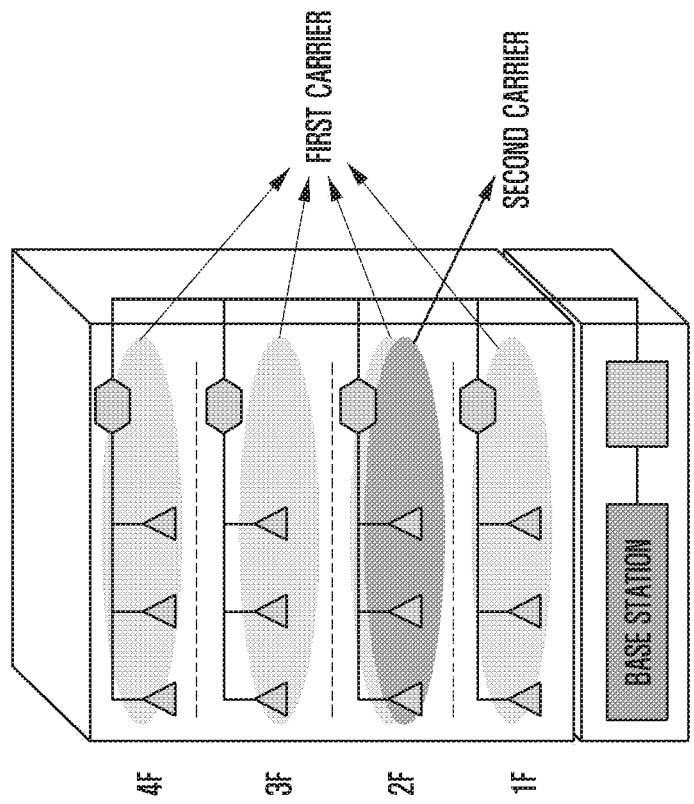
FIGS. 5A and 5B are diagrams illustrating an example of automatically increasing a carrier when a traffic amount instantaneously increases according to various embodiments of the present disclosure.
Figure 5A:
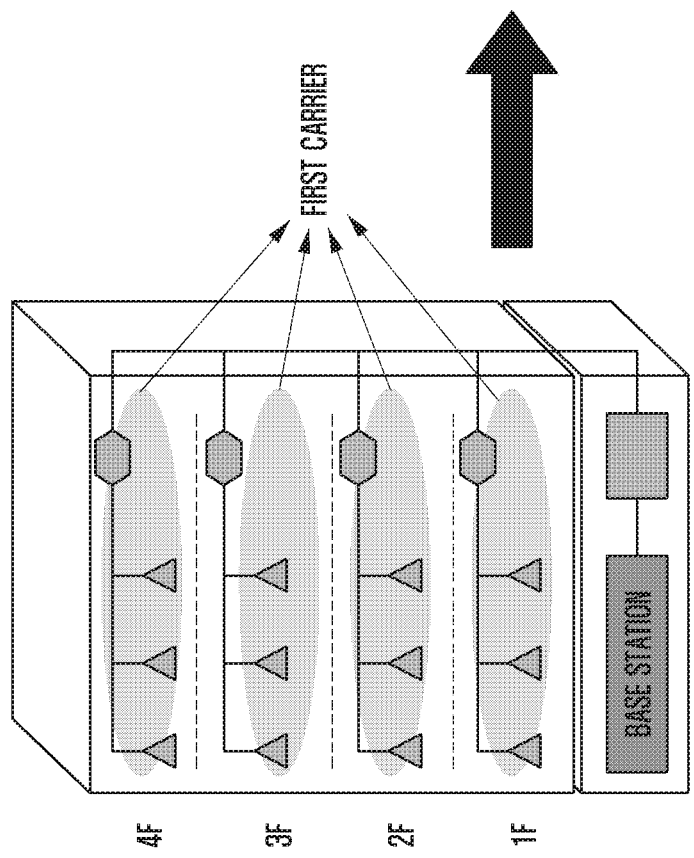

FIGS. 5A and 5B are diagrams illustrating an example of automatically increasing a carrier when a traffic amount instantaneously increases according to various embodiments of the present disclosure.

When installing a DAS, a mobile communication network provider constructs a system that can support a multiple frequency band. Because most modem cards (e.g., channel card) of the base station have a function of supporting a plurality of cells, a modem that is not in use is allocated for a carrier to use when increasing a cell capacity.

Referring to FIG. 5A, a diagram is provided that illustrates a base station that provides a service in a building normally using one carrier. The base station provides a service to first, second, third, and fourth floors 1F, 2F, 3F, and 4F, using a first carrier. In this case, in the base station, when an overload occurs in which traffic increases, compared with a cell capacity, the base station determines whether the number of users and a traffic amount of a floor has become large, and adds a carrier only to a floor in which a cell capacity is insufficient, thereby increasing a cell capacity.

Referring to FIG. 5B, a diagram is provided that illustrates a base station using two carriers, wherein one carrier is assigned only to a floor in which an overload has occurred. For example, when a traffic amount increases at a second floor 2F, the base station may additionally provide service at the second floor using the second carrier, in addition to the first carrier. The base station can continue to provide service at the first, third and fourth floors 1F, 3F and 4F using the first carrier. Users located at the second floor may perform handover with the second carrier or may use carrier aggregation of the first carrier and the second carrier. Through carrier increase, even when traffic suddenly increases, the base station can efficiently provide service to the user.

Figure 6:
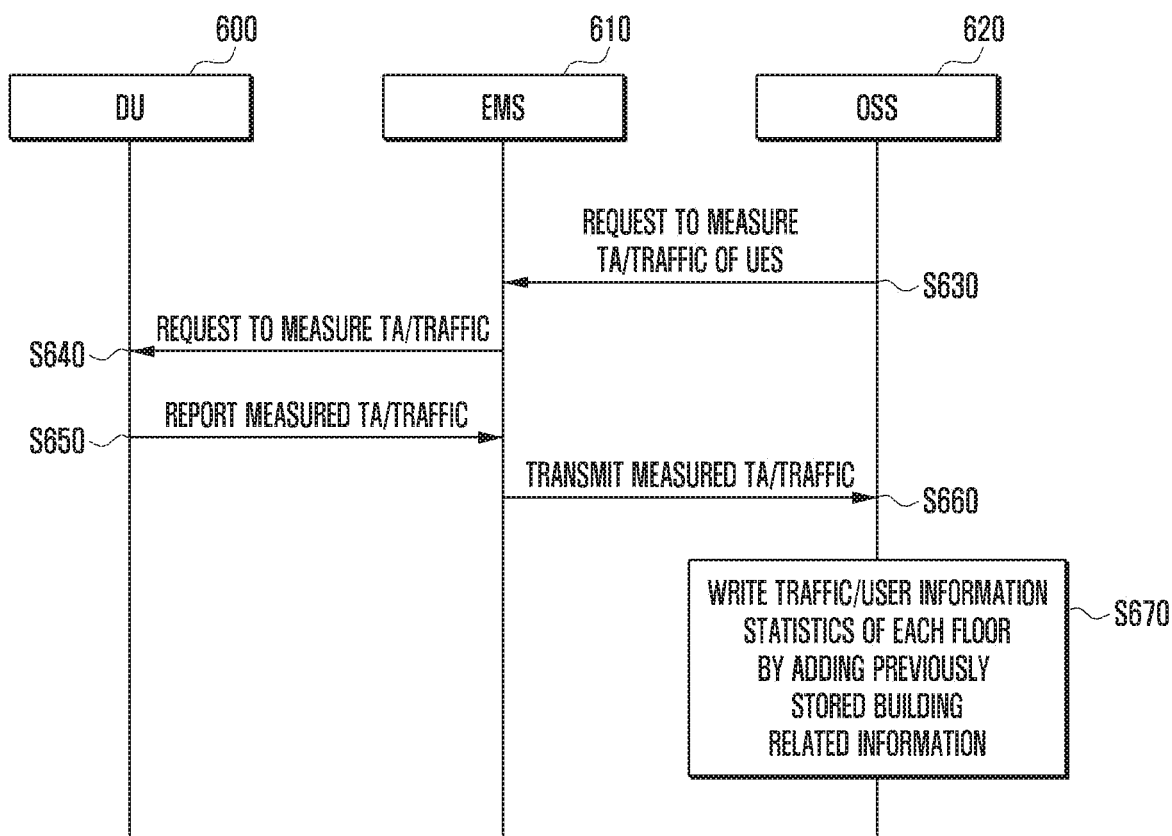
FIG. 6 is a message flow diagram illustrating a method of collecting a number of users and traffic information of each floor in a building according to an embodiment of the present disclosure.

FIG. 6 is a message flow diagram illustrating a method of collecting a number of users and traffic information of each floor in a building according to an embodiment of the present disclosure.

Referring to FIG. 6, an operation support system (OSS) 620 sends a request to periodically or temporally measure TA and traffic of a plurality of UEs located in a building to an element management system (EMS) 610 in operation S630. The EMS 610 sends a request to measure TA and traffic of a plurality of UEs to a digital unit (e.g., DU or base station) 600 in operation S640. The DU 600 reports the measured TA and traffic of the UE to the EMS 610 in operation S650, and the EMS 610 transmits the measured TA and traffic of the UE to the OSS 620 in operation S660. The OSS 620 analyzes the measured TA and traffic of the UE based on previously stored building related information and determines traffic/user information statistics of each floor in operation S670. The previously stored building related information may include a floor in which the base station provides a service and a pseudo delay value of a UE that is set on a floor by floor basis.

Figure 7:
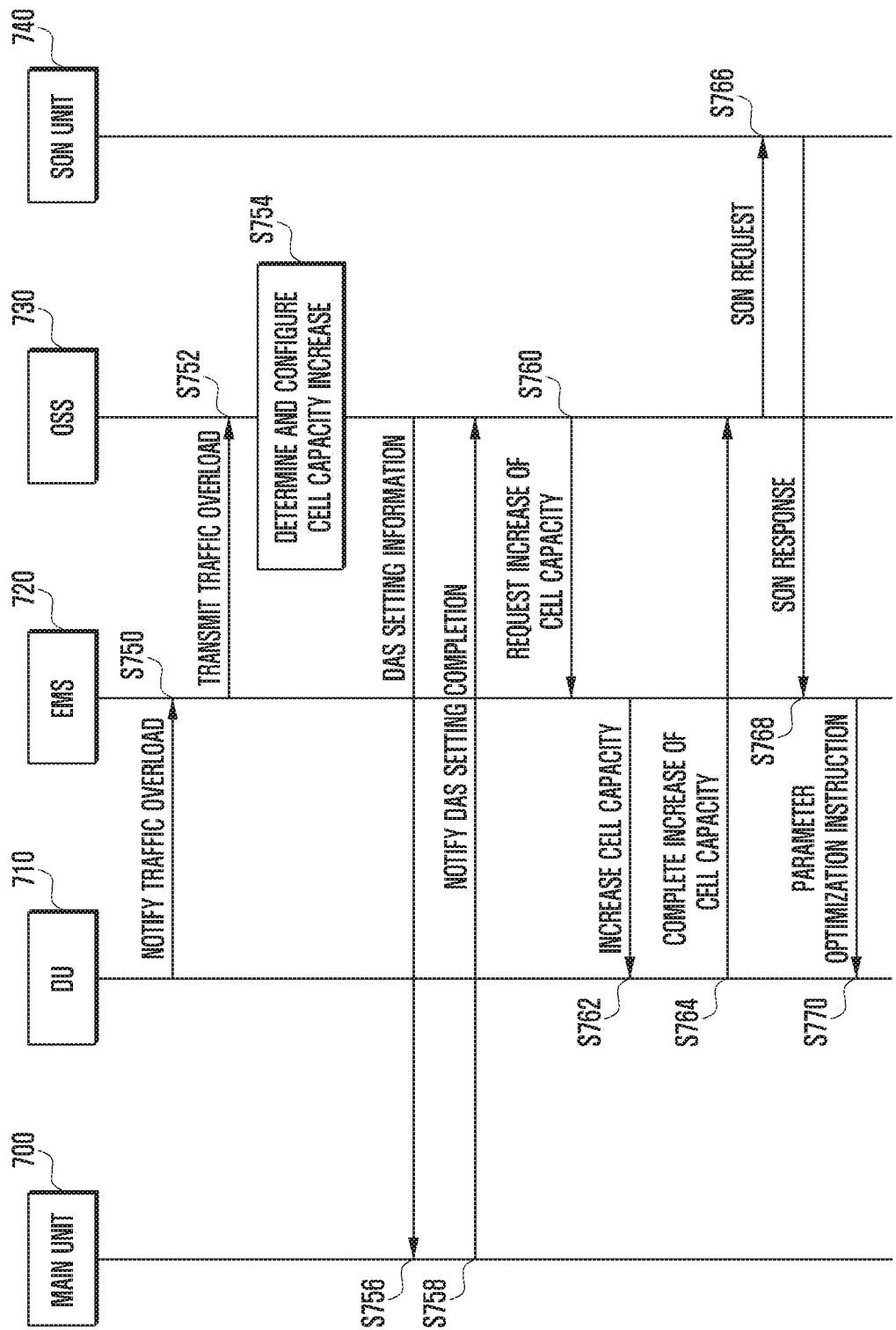
FIG. 7 is a message flow diagram illustrating a method of installing an additional carrier that provides service to a building according to an embodiment of the present disclosure.

FIG. 7 is a message flow diagram illustrating a method of installing an additional carrier that provides a service to a building according to an embodiment of the present disclosure.

Referring to FIG. 7, when traffic is greater than a preset cell capacity due to increased traffic, a DU 710 measures traffic in the building and notifies an EMS 720 of a traffic overload in operation S750. The EMS 720 transmits a traffic overload communication to an OSS 730 in operation S752. The OSS 730 configures cell capacity increase determination and configuration (setting) of cell capacity increase, such as a carrier to provide additional service and additional service providing time in operation S754. The OSS 730 then transmits DAS configuration information according to cell capacity increase to a main unit 700 in operation S756, and the main unit 700 sets a DAS according to the received DAS configuration information and notifies the OSS 730 that DAS configuration is complete in operation S758.

The OSS 730 also sends a cell capacity increase request to the EMS 720 in operation S760, and the EMS 720 instructs the DU 710 to increase a cell capacity using an additional carrier in operation S762. The DU 710 is set to provide a service using the additional carrier and notifies the OSS 730 that cell capacity increase is complete in operation S764. The OSS 730 transmits a self-optimization networks (SON) request such as handover optimization, load balancing, and mobility robustness optimization to a SON unit 740 that automatically adjusts a parameter when a network is additionally installed in operation S766. The SON unit 740 provides a SON response including an optimized parameter to the EMS 720 in operation S768, and the EMS 720 transmits a parameter optimization instruction according to the SON response to the DU 710 in operation S770.

Figure 8:
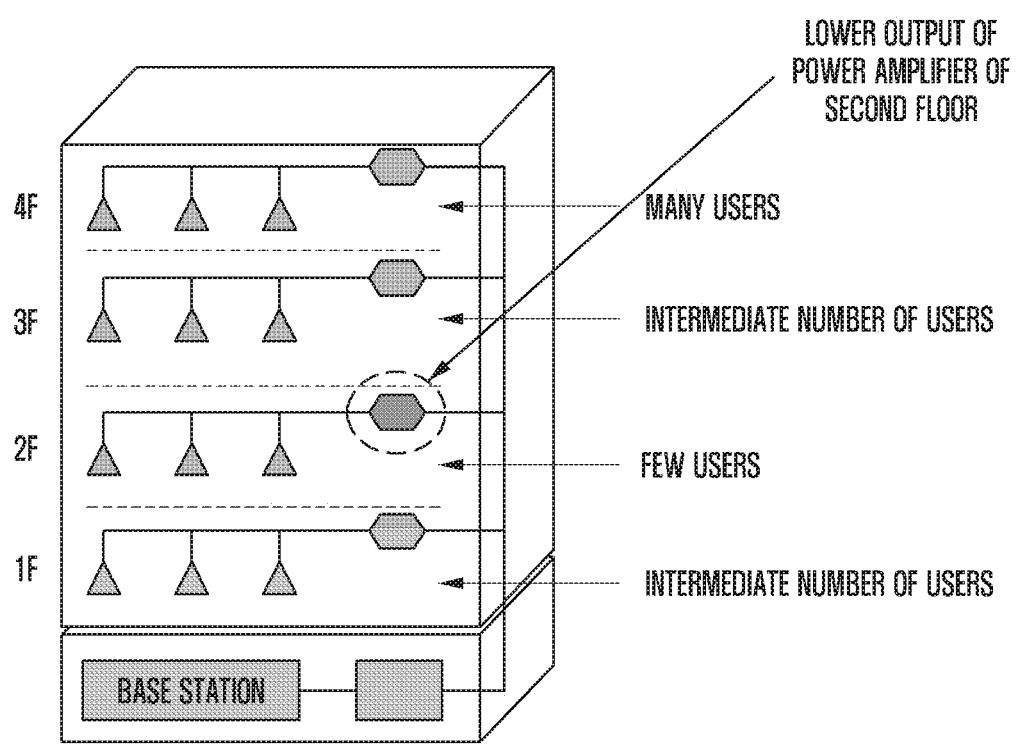
FIG. 8 is a diagram illustrating an example of efficiently using power in consideration of user distribution of each floor according to an embodiment of the present disclosure.

FIG. 8 is a diagram illustrating an example of efficiently using power in consideration of user distribution of each floor according to an embodiment of the present disclosure.

Referring to FIG. 8, a base station provides a service to first, second, third, and fourth floors 1F, 2F, 3F and 4F. As a result in which the base station collects the number of users and traffic information of each floor by statistical information, when an intermediate number of users exist at a first floor and a third floor, many users exist at a fourth floor, and scarcely any users exist at a second floor, the base station lowers an output of a power amplifier at the second floor, thereby efficiently using power.

Figure 9:
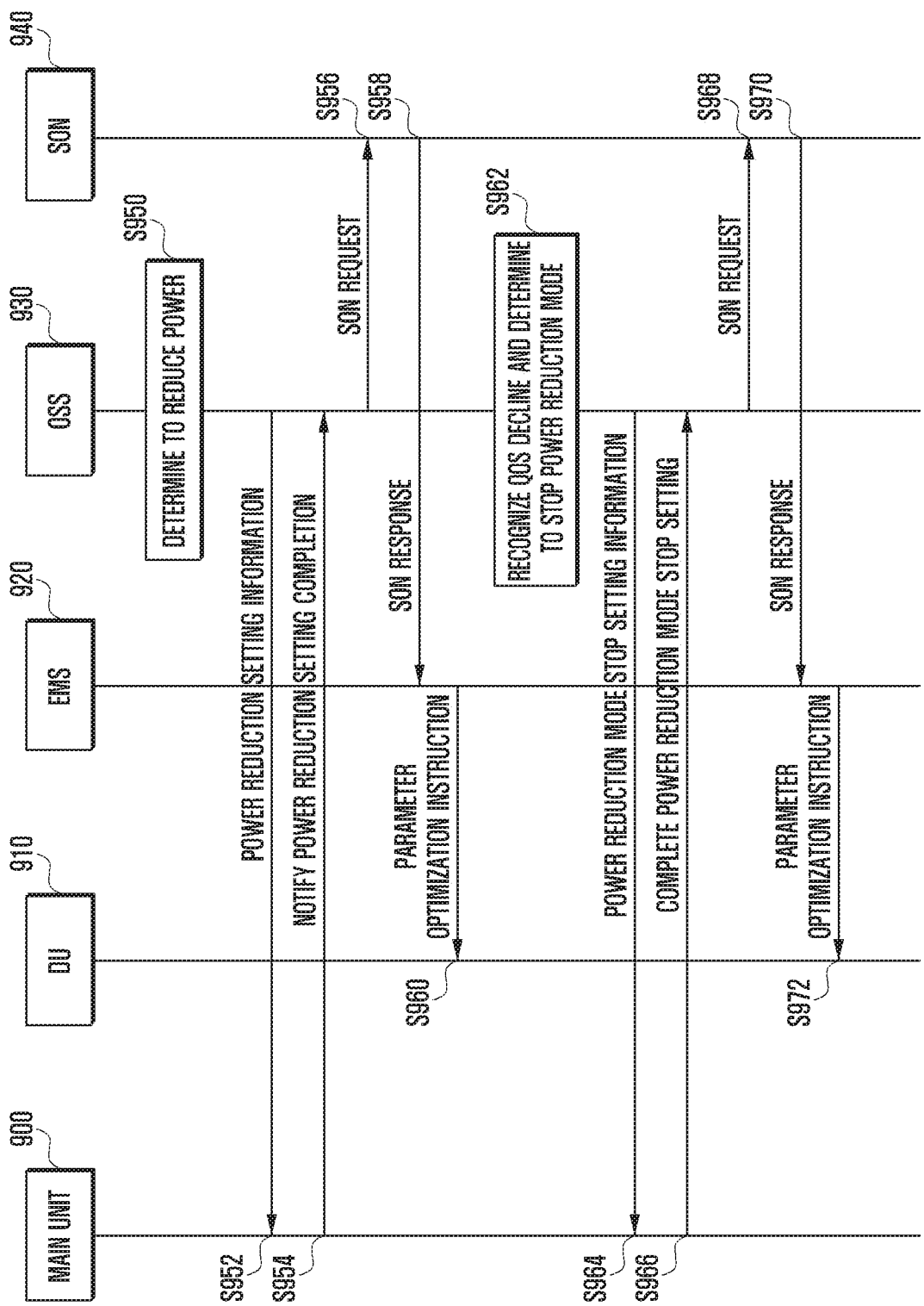
FIG. 9 is a message flow diagram illustrating a method of efficiently using power in consideration of user distribution of each floor according to an embodiment of the present disclosure.

FIG. 9 is a message flow diagram illustrating a method of efficiently using power in consideration of user distribution of each floor according to an embodiment of the present disclosure.

Referring to FIG. 9, when a number of users located at a specific floor is a few based on the number of users and traffic information of each floor, the OSS 930 determines to reduce power in a power amplifier located at the specific floor in operation S950. The OSS 930 transmits power reduction configuration information to a main unit 900 in operation S952. The main unit 900 completes a power reduction configuration that reduces power of the power amplifier located at a specific floor and notifies the OSS 930 of configuration completion in operation S954.

The OSS 930 then transmits a SON request such as handover optimization, load balancing, and mobility robustness optimization to a SON unit 940 that automatically adjusts a parameter when installing an additional network in operation S956. The SON unit 940 provides a SON response including an optimized parameter to an EMS 920 in operation S958, and the EMS 920 transmits a parameter optimization instruction according to the SON response to a DU 910 in operation S960.

When the OSS 930 recognizes that a quality of service (QoS) of a specific floor in which use power of a power amplifier has been reduced is lowered to a specific value or less, the OSS 930 determines to stop the power reduction mode in operation S962. The OSS 930 transmits power reduction mode stop configuration information to the main unit 900 in operation S964. The main unit 900 completes power reduction mode stop configuration that returns power of the power amplifier located at the specific floor to an original power and notifies the OSS 930 of configuration completion in operation S966.

The OSS 930 then transmits another SON request such as handover optimization, load balancing, and mobility robustness optimization to the SON unit 940 in operation S968. The SON unit 940 provides a SON response including an optimized parameter to the EMS 920 in operation S970, and the EMS 920 transmits a parameter optimization instruction according to the SON response to the DU 910 in operation S972.

Figure 10:
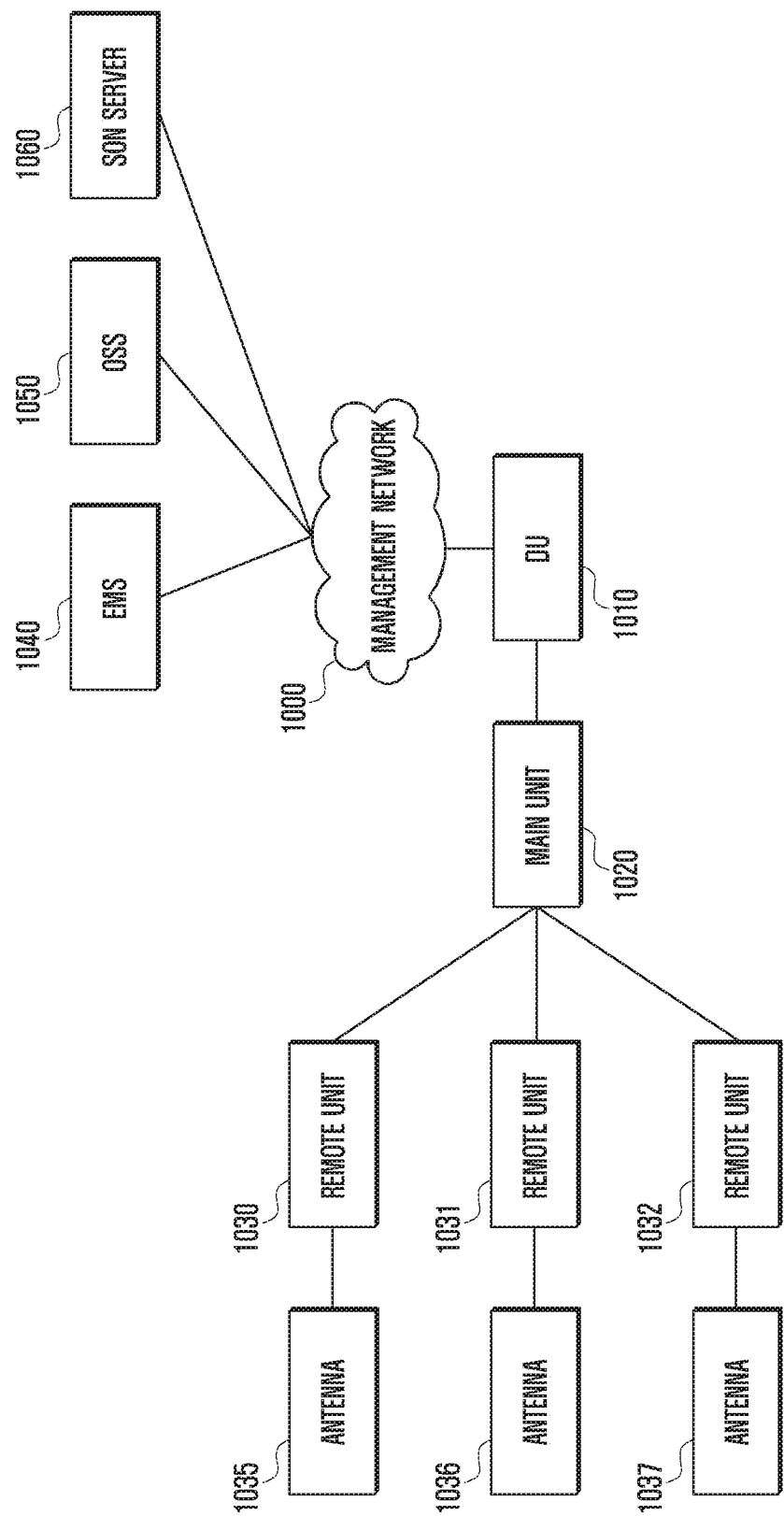
FIG. 10 is a block diagram illustrating a configuration of a system according to an embodiment of the present disclosure.

FIG. 10 is a block diagram illustrating a configuration of a system according to an embodiment of the present disclosure.

Referring to FIG. 10, a main unit 1020 is connected to a plurality of remote units 1030, 1031, and 1032 located at each floor of a building, and the plurality of remote units 1030, 1031, and 1032 are connected to antennas 1035, 1036, and 1037, respectively, located at each floor. The main unit 1020 is connected to a DU 1010 of a multi-standard radio (MSR) specification, and the DU 1010 is connected to a management network 1000. The management network 1000 is connected to an EMS 1040, OSS 1050, and SON server 1060. A unit, server, and system of FIG. 10 may be implemented through the same hardware or may be implemented through separated hardware to be physically located at the same location or to be separately located.

FIG. 11 is a block diagram illustrating a configuration of a system including a main unit and remote units according to an embodiment of the present disclosure.

Referring to FIG. 11, a base station (e.g., baseband unit) 1100 may be connected to a main unit 1110. The main unit 1110 may include a common public radio interface (CPRI) unit 1114 that connects the base station 1100 and the main unit 1110, format conversion/compression unit 1113 that transmits data and control information between the base station 1100 and the main unit 1110, delay unit 1112 that determines a pseudo delay value to apply to each floor and that enables the transmission of the determined pseudo delay value to remote units located at each floor, and optic switch 1111 that connects the remote units and the main unit 1110, and that adjusts power of the remote units. Further, a controller, processor or module (not shown) may be provided that integrally controls each unit and determines a pseudo delay value to apply to each floor and control the transmission of the determined pseudo delay value to remote units located at each floor, connect the base station and the remote units to the main unit 1110, and transmit and receive a signal. A transmitting and receiving unit (not shown) may be provided that transmits and receives a signal between the base station, the main unit 1110, and the remote units.

A plurality of remote units are connected to the main unit 1110. A first remote unit 1120 includes a digital-analog converter 1123 and power amplifiers 1121 and 1122 of each frequency band, and a second remote unit 1130 includes a digital-analog converter 1133 and power amplifiers 1131 and 1132 of each frequency band.

As described above, according to a system and method of measuring traffic of each floor of a building according to an embodiment of the present disclosure and by efficiently increasing a carrier according to a traffic amount through the traffic measurement and adjusting power of an amplifier on a floor by floor basis, a mobile communication network provider can efficiently operate a network and maintain a user's quality of experience (QoE).

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method of a base station in a communication system, the method comprising:
allocating a pseudo timing advance (TA) value to each of a plurality of remote units corresponding to different locations within a building, the pseudo TA having a different value for each of a plurality of radio units;
transmitting a pseudo TA allocated to a remote unit to a user equipment (UE) associated with the remote unit;
receiving an uplink signal from the UE;
identifying a TA of the UE using the uplink signal transmitted by the UE;
determining a location for the UE based on the pseudo TA allocated to the remote unit and the identified TA;
receiving power reduction mode stop configuration information from a network management entity in a case that it is recognized that a quality of service (QoS) of the UE at a location to which a power reduction configuration is applied, is lowered to a specific value or less by an operation support system;
configuring stopping of the power reduction mode based on the received power reduction mode stop configuration information; and
transmitting power reduction mode stop configuration completion information to the operation support system,
wherein the uplink signal is transmitted from the UE based on the pseudo TA allocated to the remote unit.

2. The method of claim 1, further comprising:
comparing a value of the pseudo TA and a value of the identified TA;
determining a difference between the TA value of the UE and the pseudo TA value; and
determining the location for the UE based on the difference and a threshold value.

3. The method of claim 1, further comprising:
transmitting a traffic overload notification to an element management system; and
receiving a distributed antenna system (DAS) configuration according to a determination to increase a cell capacity from the element management system,
wherein increasing of the cell capacity at a location at which an overload is located is determined based on the traffic overload notification.

4. The method of claim 3, further comprising configuring an additional carrier to the location at which the overload is located.

5. The method of claim 1, further comprising:
receiving power reduction configuration information from an operation support system;
configuring power reduction at a location at which the power reduction is desired based on the received power reduction configuration information; and
transmitting power reduction configuration completion information to the operation support system.

6. A base station in a communication system, the base station comprising:
a plurality of remote units configured to transmit and receive signals, each of the plurality of remote units corresponding to different locations within a building, a pseudo timing advance (TA) being allocated to each of the plurality of remote units and the pseudo TA having a different value for each of a plurality of radio units, wherein a pseudo TA allocated to a remote unit is transmitted to a user equipment (UE) associated with the remote unit; and
a main unit coupled with the plurality of remote units and configured to process the signals, wherein an uplink signal is received, via the plurality of remote units, from the UE,
wherein a TA for the UE is identified using the uplink signal,
wherein a location for the UE is determined based on the pseudo TA allocated to the remote unit and the identified TA,
wherein the uplink signal is transmitted from the UE based on the pseudo TA allocated to the remote unit, and
wherein the main unit is further configured to:
receive power reduction mode stop configuration information from a network management entity in a case that it is recognized that a quality of service (QoS) of the UE at a location to which a power reduction configuration is applied, is lowered to a specific value or less by an operation support system,
configure stopping of the power reduction mode based on the received power reduction mode stop configuration information, and
transmit power reduction mode stop configuration completion information to the operation support system.

7. The base station of claim 6,
wherein a value of the pseudo TA is compared with a value of the identified TA,
wherein a difference between the value of the pseudo TA and the value of the identified TA is determined, and
wherein the location for the UE is determined based on the difference and a threshold value.

8. The base station of claim 6,
wherein a traffic overload notification is transmitted to an element management system, and
wherein a distributed antenna system (DAS) configuration according to determination to increase of a cell capacity for the location is received from the element management system,
wherein increasing of the cell capacity for the location is determined based on the traffic overload notification.

9. The base station of claim 6, wherein an additional carrier to the location is based on a distributed antenna system (DAS) configuration.

10. The base station of claim 6,
wherein power reduction configuration information is received from an operation support system,
wherein power reduction at the location based on the received power reduction configuration information is configured, and
wherein power reduction configuration completion information is transmitted to the operation support system.

11. A base station to provide service to a user equipment (UE), the base station comprising:

a plurality of remote units configured to transmit and receive signals, each of the plurality of remote units corresponding to different locations within a building, a pseudo timing advance (TA) being allocated to each of the plurality of remote units and the pseudo TA having a different value for each of a plurality of radio units, wherein a pseudo TA allocated to a remote unit is transmitted to the UE associated with the remote unit; and
a main unit coupled with the plurality of remote units and configured to process the signals, wherein an uplink signal is received, via the plurality of remote units, from the UE,
wherein a TA for the UE is identified using the uplink signal,
wherein a location for the UE is determined based on the pseudo TA allocated to the remote unit and the identified TA,
wherein the uplink signal is transmitted from the UE based on the pseudo TA allocated to the remote unit,
wherein an additional communication resource is configured to a location at which an overload is located based on at least one of a number of users and a traffic of each location, and
wherein the main unit is further configured to:
receive power reduction mode stop configuration information from a network management entity in a case that it is recognized that a quality of service (QoS) of the UE at a location to which a power reduction configuration is applied, is lowered to a specific value or less by an operation support system,
configure stopping of the power reduction mode based on the received power reduction mode stop configuration information, and
transmit power reduction mode stop configuration completion information to the operation support system.

* * * * *